United States Patent
Wan

(10) Patent No.: US 10,656,370 B2
(45) Date of Patent: May 19, 2020

(54) LENS MODULE

(71) Applicant: Jia Wan, Shenzhen (CN)

(72) Inventor: Jia Wan, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 0 days.

(21) Appl. No.: 15/680,284

(22) Filed: Aug. 18, 2017

(65) Prior Publication Data

US 2018/0299639 A1 Oct. 18, 2018

(30) Foreign Application Priority Data

Apr. 15, 2017 (CN) .................... 2017 2 0398162 U

(51) Int. Cl.
   *G02B 7/02* (2006.01)
   *G02B 5/00* (2006.01)
   *G02B 13/00* (2006.01)

(52) U.S. Cl.
   CPC ............. *G02B 7/026* (2013.01); *G02B 5/005* (2013.01); *G02B 7/021* (2013.01); *G02B 13/004* (2013.01)

(58) Field of Classification Search
   CPC ...... G02B 27/0018; G02B 7/02; G02B 5/003; G02B 5/005; G02B 7/026
   See application file for complete search history.

(56) References Cited

U.S. PATENT DOCUMENTS

| | | | | |
|---|---|---|---|---|
| 5,475,460 A | * | 12/1995 | Stephenson | G03B 15/00 396/1 |
| 9,842,872 B2 | * | 12/2017 | Iwafuchi | H01L 27/14618 |
| 2006/0083021 A1 | * | 4/2006 | Jeong | G02B 6/0021 362/561 |
| 2011/0050988 A1 | * | 3/2011 | Yano | G02B 13/001 348/374 |
| 2011/0158633 A1 | * | 6/2011 | Lai | G02B 3/00 396/439 |
| 2013/0176625 A1 | * | 7/2013 | Chen | G02B 3/0056 359/619 |
| 2014/0104691 A1 | * | 4/2014 | Chang | G02B 7/021 359/611 |
| 2014/0160581 A1 | * | 6/2014 | Cho | G02B 27/0018 359/738 |
| 2015/0331219 A1 | * | 11/2015 | Chen | G02B 7/021 359/771 |
| 2016/0178805 A1 | * | 6/2016 | Kang | G02B 7/021 359/614 |
| 2016/0349504 A1 | * | 12/2016 | Kim | G02B 27/0018 |
| 2016/0370579 A1 | * | 12/2016 | Cho | G02B 27/0018 |

* cited by examiner

*Primary Examiner* — William R Alexander
*Assistant Examiner* — Balram T Parbadia
(74) *Attorney, Agent, or Firm* — IPro, PLLC; Na Xu

(57) ABSTRACT

The present disclosure provides a lens module. The lens module includes a lens barrel with an optical aperture, the lens barrel including an outer wall and an inner wall opposite to the outer wall; at least one lens located in the lens barrel; a shading piece located by an object side or/and an image side of the lens. The shading piece includes an upper surface near the optical aperture, a lower surface away from the optical aperture, an outer ring surface connecting to the upper surface and the lower surface and near the inner wall of the lens barrel, and an inner ring surface connecting to both upper surface and lower surface and opposite to the outer ring surface. The inner ring surface is an arc facing an optical axis of the lens module.

7 Claims, 2 Drawing Sheets

LENS MODULE

FIELD OF THE PRESENT DISCLOSURE

The present disclosure relates to optical imaging technology, especially for a lens module used for various electronic equipment.

DESCRIPTION OF RELATED ART

Recent years, with a development of imaging technology and an emerging of an electronic product with an imaging function, an optical imaging lens has been extensively applied in various products, and improved and optimized constantly. Currently, a direction of improving most of imaging lenses is how to make the imaging lens smaller and thinner, and choose a proper lens with a good degree of adaptability of optical characteristics while making the imaging lens smaller and thinner, and study how to integrate them together to guarantee a good imaging result. The shading components, are usually used in a lens module for reflecting and absorbing the stray light, while the outside light enters into the lens module, the shading piece set in the lens module can stop the entry of the unnecessary light. However, although the shading piece used in the lens module controls the light, while the light is irradiating on the shading piece, the light reflected by the shading piece will interfere with the whole optical system, for example, while taking a picture, these stray light will generate unnecessary image on an imaging surface of a lens module, including a ghost image or sparkle etc.

Therefore it is necessary to provide a lens module for overcoming the above-mentioned disadvantages.

BRIEF DESCRIPTION OF THE DRAWINGS

Many aspects of the exemplary embodiments can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 1:
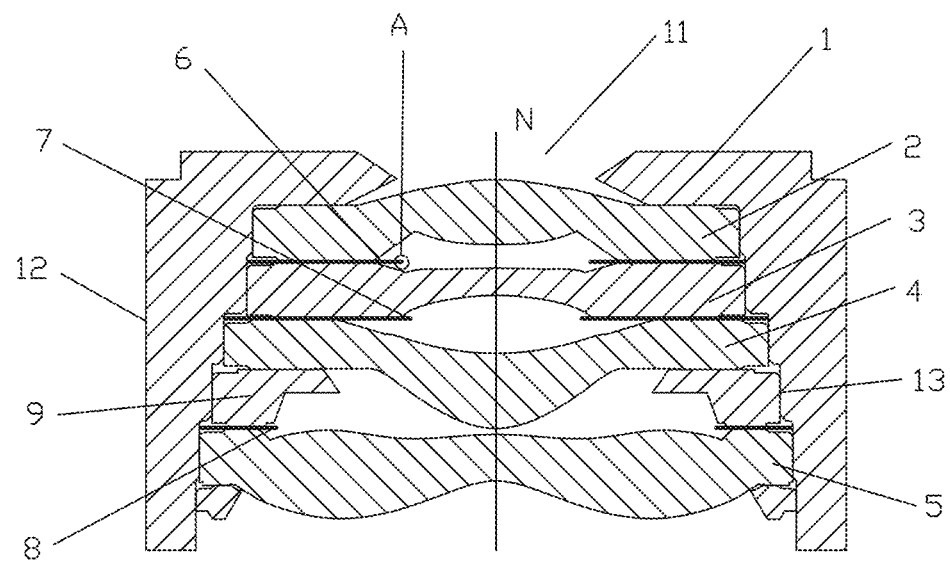
FIG. 1 is an illustrative cross-sectional view of a lens module including a shading piece in accordance with an exemplary embodiment of the present disclosure.
Figure 2:
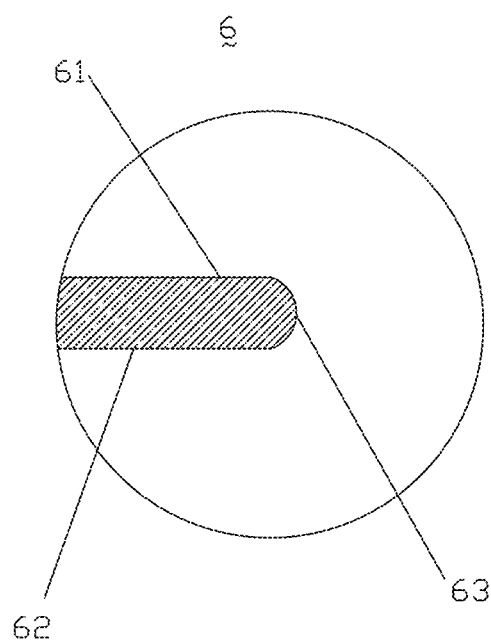
FIG. 2 is an enlarged view of Part A in FIG. 1.

A first embodiment of the present disclosure relates to a lens module. As shown in FIGS. 1-2, the lens module includes a lens barrel 1 with an optical aperture 11, a lens 2, a lens 3, a lens 4 and a lens 5 set in the lens barrel 1, and a shading piece 6, a shading piece 7, a shading piece 8 and a shading board 9 set in the lens barrel 1. The lens barrel 1 includes an outer wall 12 and an inner wall 13 opposite to the outer wall 12. In which, the appearance structures from the shading piece 6 to 8 are the same. Meanwhile, except the lens 5, one piece of shading piece is set between every two adjacent lenses. The shading board 9 is located between the lens 4 and 5, and the shading piece 8 is set between the shading board 9 and lens 5. In this embodiment, there are 4 lenses set, and 3 shading pieces set, and 1 shading board set, in other embodiment, the amount of the lens, shading board and shading piece depends on the actual needs.

Taking a shading piece 6 for example, the shading piece 6 includes an upper surface 61, a lower surface 62, an outer ring surface and an inner ring surface 63. In which, the upper surface 61 is near an optical aperture 11, and the lower surface 62 is away from the optical aperture 11, and the upper surface 61 and lower surface 62 are set oppositely, i.e.: the upper surface 61 is located opposite to the lower surface 62. The outer ring surface is near an inner wall 13 of a lens barrel 1, and connects both upper surface 61 and lower surface 62, and the inner ring surface 63 and the outer ring surface are set oppositely and connect to the upper surface 61 and the lower surface 62. Meanwhile, the inner ring surface 63 is an arc projecting towards an optical axis N.

Through above content, it is not difficult to find out that, set an inner ring surface 63 as a convex arc extending towards an optical axis N, and make the inner ring surface convex, in order to increase the area of the inner ring surface and add a direction of reflection, after the incident light enters, it can diffuse the reflection light irregularly, in order to reduce the energy of the reflection light, and decrease the interference to an optical system by the reflection light, and improve a ghost image and sparkle etc and improve the imaging quality of the whole lens module.

Specifically, as shown in FIG. 2, an inner ring surface 63 of a shading piece 6 in the present embodiment is a Lambertian surface, i.e.: including but not limited to the rough processing of the inner ring surface 63, in order to make it become a Lambertian body, and form reachable diffuse reflection, and improve the ghost image and sparkle etc, and improve the imaging quality of the whole imaging lens.

In addition, as shown in FIG. 2, a vertical distance from one end connecting an inner ring surface 63 to an upper surface 61 to an optical axis N is equal to a vertical distance from the one end connecting the inner ring surface 63 to a lower surface 62 to an optical axis N, and the upper surface 61 and the lower surface 62 are in parallel mutually, and connect the upper surface 61 and the lower surface 62 to form the outer ring surface and inner ring surface 63, and the inner ring surface 63 is a round arc shape projecting towards the optical axis N, in order to achieve different imaging results and improve the imaging quality of the whole imaging lens.

The appearance structures of both shading piece 7 and shading piece 8 are consistent with the structure appearance of the shading piece 6, without further detailed description.

Further, as shown in FIGS. 1-2, the shading piece 6 is clamped between the adjacent lens 2 and lens 3, i.e.: the shading piece 6 is put by an image side of the lens 2 and an object side of the lens 3, and the upper surface 61 of the shading piece 6 is leaned with the lens 2, and the lower surface 62 of the shading piece 6 is leaned with the lens 3, in order to reflect and absorb the stray light and further improve the imaging quality of the imaging lens. The configuration of the shading piece 7 in the lens barrel 1 is similar with the shading piece, without further detailed description.

Finally, as shown in FIGS. 1-2, the lens module also includes the shading board 9 set in the lens barrel 1, and the shading piece 8 is clamped between the shading board 9 and lens 5, and the upper surface of the shading piece 8 and the shading board 7 are leaned each other, and the lower surface of the shading piece 8 and the lens 5 are leaned each other, in order to reflect and absorb the stray light and further improve the imaging quality of the imaging lens.

Figure 3:
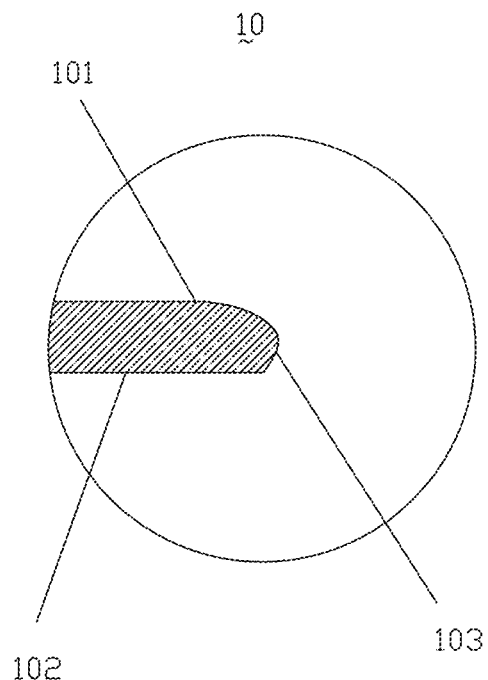
FIG. 3 is an illustration of a shading piece in another embodiment.

Referring to FIG. 3, a second embodiment of the present disclosure relates to a kind of lens module. The second embodiment is roughly the same as the first embodiment, the key difference lies in that: In a first embodiment, a vertical distance from one end connecting an inner ring surface 63 to an upper surface 61 to an optical axis N is equal to a vertical distance from the one end connecting the inner ring surface 63 to a lower surface 62 to an optical axis N. However, in the second embodiment, as shown in FIG. 3, the appearance structures of various shading pieces are the same, taking the shading piece 10 for example, the inner ring surface 103 of the shading piece 10 is a convex arc, and the vertical distance from one end connecting the inner ring surface 103 to the upper surface 101 to the optical axis is more than the vertical distance from one end connecting the inner ring surface 103 to the lower surface 102 to the optical axis, in order to achieve different imaging result.

Figure 4:
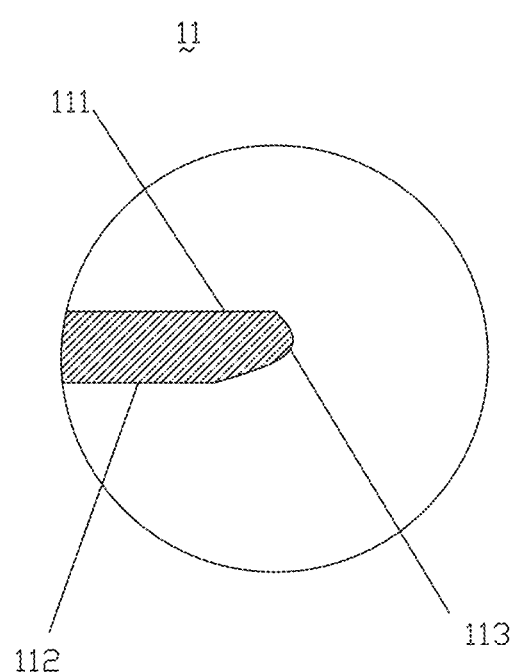
FIG. 4 is an illustration of a shading piece in another embodiment.

Referring to FIG. 4, a third embodiment of the present disclosure relates to a kind of a lens module, and the third embodiment is roughly the same as the first embodiment and the second embodiment, and the key difference lies in that: In a first embodiment, a vertical distance from one end connecting an inner ring surface 63 to an upper surface 61 to an optical axis N is equal to a vertical distance from the one end connecting the inner ring surface 63 to a lower surface 62 to an optical axis N. In the second embodiment, the vertical distance from one end connecting the inner ring surface 103 to the upper surface 101 of a shading piece 10 to the optical axis is more than the vertical distance from one end connecting the inner ring surface 103 to the lower surface 102 to the optical axis. However, in the third embodiment, as shown in FIG. 4, the appearance structures of various shading pieces are the same, taking the shading piece 11 for example, the inner ring surface 113 of the shading piece 11 is a convex arc, and the vertical distance from one end connecting the inner ring surface 113 to the upper surface 111 to the optical axis is less than the vertical distance from one end connecting the inner ring surface 113 to the lower surface 112 to the optical axis, in order to achieve different imaging result.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A lens module including:
   a lens barrel with an optical aperture, the lens barrel including an outer wall and an inner wall opposite to the outer wall;
   at least one lens located in the lens barrel;
   a shading piece located by an object side or/and an image side of the lens, the shading piece including an upper surface near the optical aperture, a lower surface away from the optical aperture, an outer ring surface directly connecting to the upper surface and the lower surface and near the inner wall of the lens barrel, and an inner ring surface directly connecting to both upper surface and lower surface and opposite to the outer ring surface, wherein
   the inner ring surface is a convex arc facing an optical axis of the lens module in a cross sectional view containing the optical axis, the point closest to the optical axis in the inner ring surface is closer to the optical axis than the lower surface and the upper surface.

2. The lens module as described in claim 1, wherein the inner ring surface of the shading piece is a Lambertian surface.

3. The lens module as described in claim 2 including at least two pieces of lenses located in the lens barrel, wherein the shading piece is clamped between any two adjacent lenses.

4. The lens module as described in claim 2 further including a shading board in the lens barrel, wherein the shading piece is clamped between the shading board and the lens.

5. The lens module as described in claim 1, wherein a vertical distance from one end connecting the arc to the upper surface to the optical axis is equal to a vertical distance from the one end connecting the arc to the lower surface to the optical axis.

6. The lens module as described in claim 1, wherein a vertical distance from one end connecting the arc to the upper surface to the optical axis is less than a vertical distance from the one end connecting the arc to the lower surface to the optical axis.

7. The lens module as described in claim 1, wherein a vertical distance from one end connecting the arc to the upper surface to the optical axis is more than a vertical distance from the one end connecting the arc to the lower surface to the optical axis.

* * * * *